US010896543B2

(12) United States Patent
Kuffner

(10) Patent No.: US 10,896,543 B2
(45) Date of Patent: Jan. 19, 2021

(54) METHODS AND SYSTEMS FOR AUGMENTED REALITY TO DISPLAY VIRTUAL REPRESENTATIONS OF ROBOTIC DEVICE ACTIONS

(71) Applicant: X Development LLC, Mountain View, CA (US)

(72) Inventor: James Joseph Kuffner, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 460 days.

(21) Appl. No.: 14/829,716

(22) Filed: Aug. 19, 2015

(65) Prior Publication Data

US 2016/0055677 A1 Feb. 25, 2016

Related U.S. Application Data

(60) Provisional application No. 62/041,173, filed on Aug. 25, 2014.

(51) Int. Cl.
*G09G 5/00* (2006.01)
*G06T 19/00* (2011.01)
(Continued)

(52) U.S. Cl.
CPC .......... *G06T 19/006* (2013.01); *B62D 57/032* (2013.01); *G06F 1/163* (2013.01); *G06F 3/005* (2013.01); *G06T 11/00* (2013.01)

(58) Field of Classification Search
None
See application file for complete search history.

(56) References Cited

U.S. PATENT DOCUMENTS 8,225,226 B2  7/2012  Skourup et al.
8,386,078 B1  2/2013  Hickman et al.
(Continued)

FOREIGN PATENT DOCUMENTS

JP  2009-123045  6/2009
JP  2012-171024  9/2012
(Continued)

OTHER PUBLICATIONS

M. F. Zaeh and W. Vogl, "Interactive Laser-Projection for Programming Industrial Robots", Published in: Mixed and Augmented Reality, 2006. ISMAR 2006. IEEE/ACM International Symposium on, Oct. 22-25, 2006.*

(Continued)

*Primary Examiner* — Weiming He
(74) *Attorney, Agent, or Firm* — McDonnell Boehnen Hulbert & Berghoff LLP

(57) ABSTRACT

Example methods and systems for augmented reality interfaces to display virtual representations of robotic device actions are provided. An example method includes receiving information that indicates an action or an intent of a robotic device to perform a task, and the action or the intent includes one or more of a planned trajectory of the robotic device to perform at least a portion of the task and an object to be handled by the robotic device to perform at least a portion of the task. The method also includes providing, for display by a computing device on an augmented reality interface, a virtual representation of the action or the intent, and the virtual representation includes as annotations on the augmented reality interface at least a portion of the planned trajectory of the robotic device or highlighting the object to be handled by the robotic device.

11 Claims, 14 Drawing Sheets

(51) Int. Cl.
*B62D 57/032* (2006.01)
*G06F 1/16* (2006.01)
*G06F 3/00* (2006.01)
*G06T 11/00* (2006.01)

(56) References Cited

U.S. PATENT DOCUMENTS

| | | |
|---|---|---|
| 8,406,926 B1 | 3/2013 | Lewis |
| 8,447,863 B1 | 5/2013 | Francis, Jr. et al. |
| 8,594,845 B1 | 11/2013 | Gharpure |
| 2005/0227724 A1* | 10/2005 | Tsai ............... H04W 64/00 455/525 |
| 2007/0208442 A1* | 9/2007 | Perrone ............ G05D 1/0088 700/95 |
| 2008/0310705 A1 | 12/2008 | Asatani et al. |
| 2013/0117377 A1 | 5/2013 | Miller |
| 2013/0218340 A1 | 8/2013 | Hager et al. |
| 2013/0278631 A1 | 10/2013 | Border et al. |
| 2013/0343640 A1* | 12/2013 | Buehler ............ B25J 9/0087 382/155 |
| 2013/0346348 A1 | 12/2013 | Buehler et al. |
| 2014/0129942 A1* | 5/2014 | Rathod ......... H04N 21/44222 715/720 |
| 2014/0316570 A1* | 10/2014 | Sun .................. B25J 9/1674 700/255 |
| 2014/0336818 A1* | 11/2014 | Posselius ........... G05D 1/0295 700/248 |

FOREIGN PATENT DOCUMENTS

| | | |
|---|---|---|
| WO | WO 2009/063318 | 5/2009 |
| WO | 2013/074969 | 5/2013 |

OTHER PUBLICATIONS

Joel Chestnutty, Koichi Nishiwakiy, James Kuffneryz, and Satoshi Kagami, Interactive Control of Humanoid Navigation, The 2009 IEEE/RSJ International Conference on Intelligent Robots and Systems Oct. 11-15, 2009 St. Louis, USA.*

Kobayashi et al., "Viewing and reviewing how humanoids sensed, planned and behaved with mixed reality technology", Humanoid Robotics, 2007 7th IEEE-RAS International Conference, IEEE, Nov. 29, 2007, pp. 130-135.

Chestnutt et al., "Interactive control of humanoid navigation", The 2009 IEEE/RSJ International Conference on Intelligent Robots and Systems, Oct. 10, 2009, pp. 3519-3524.

Stilman et al., "Augmented reality for robot development and experimentation", Technical Report CMU-RI-TR-05-55, Nov. 30, 2005, pp. 1-11.

International Search Report and Written Opinion prepared by the European Patent Office in International Patent Application No. PCT/US2015/045787, dated Nov. 24, 2015.

Kobayashi et al., "A Reviewing System for Autonomous Humanoid Behavior Experiment with Mixed Reality", IEIC Technical Report. The Institute of Electronics, Information and Communication Engineers, 2008, vol. 108, No. 77, pp. 91-96.

Notice of Reasons for Rejection issued by the Japanese Patent Office in Application No. 2016-574225, dated Apr. 10, 2018 (English Translation included).

* cited by examiner

METHODS AND SYSTEMS FOR AUGMENTED REALITY TO DISPLAY VIRTUAL REPRESENTATIONS OF ROBOTIC DEVICE ACTIONS

CROSS REFERENCE TO RELATED APPLICATION

The present disclosure claims priority to U.S. provisional patent application No. 62/041,173 filed on Aug. 25, 2014, the entirety of which is hereby incorporated by reference.

BACKGROUND

Unless otherwise indicated herein, the materials described in this section are not prior art to the claims in this application and are not admitted to be prior art by inclusion in this section.

Robotic devices can be programmed to perform many tasks in a detailed manner, or can be programmed in a general manner and then a specific implementation of a task can be determined based on environment or objects available to the robotic device. The robotic device may utilize an audio feedback technique to inform humans nearby of an action or an intent of the robotic device, such as to inform of future actions that the robotic device intends to perform. However, auditory comments may be undesirable in some instances.

SUMMARY

Example embodiments may relate to methods and systems involving augmented reality to display virtual representations of robotic device actions or intents for performing a task. A robotic device may communicate with other nearby devices to provide information used to display the virtual representations, which may inform of future actions that the robotic device has been programmed to perform. In other examples, the robotic device may provide information regarding future actions or intents directly into a physical environment in which the robotic device operates.

Examples may be performed in combination with a cloud-based service for assisting robotic systems with environment perception and interaction. In particular, the cloud-based service may interact with a robotic system via a communication network to receive information from the robotic system as well as to send information to the robotic system. Such a configuration may reduce (or eliminate) the need for additional on-board memory and processing power on the robotic system in order to carry out certain tasks by the robotic system. Additionally, the cloud-based service may allow for data sharing among multiple robotic systems. Further, the cloud-based service may be continuously updated as robotic systems obtain information from the environment.

For instance, a robotic system may interact with the cloud-based service to receive instructions that allow the robotic system to carry out tasks. The cloud-based service may conduct large-scale simulations to generate the instructions based on various factors. Such factors may include sensor data received from the robotic system, previous procedures used by other robotic systems to carry out the task (or a similar task), and/or the configuration of the robotic system, among others.

In one aspect, a method is provided. The method comprises receiving information that indicates an action or an intent of a robotic device to perform a task, and the action or the intent includes one or more of a planned trajectory of the robotic device to perform at least a portion of the task and an object to be handled by the robotic device to perform at least a portion of the task. The method also includes providing, for display by a computing device on an augmented reality interface, a virtual representation of the action or the intent, and the virtual representation includes as annotations on the augmented reality interface at least a portion of the planned trajectory of the robotic device or highlighting the object to be handled by the robotic device.

In another aspect, a non-transitory computer readable medium is provided. The non-transitory computer readable medium has stored thereon instructions that, upon execution by a computing device, cause the computing device to perform functions. The functions include receiving information that indicates an action or an intent of a robotic device to perform a task, and the action or the intent includes one or more of a planned trajectory of the robotic device to perform at least a portion of the task and an object to be handled by the robotic device to perform at least a portion of the task. The functions also include providing, for display on an augmented reality interface, a virtual representation of the action or the intent, and the virtual representation includes as annotations on the augmented reality interface at least a portion of the planned trajectory of the robotic device or highlighting the object to be handled by the robotic device.

In still another aspect, another method is provided that comprises receiving information that indicates an action or an intent of a robotic device to perform a task, and based on the action or the intent, determining one or more of a planned trajectory of the robotic device to perform at least a portion of the task and an object to be handled by the robotic device to perform at least a portion of the task. The method also comprises determining one or more computing devices in proximity to the robotic device, and providing, for display by the one or more computing devices on an augmented reality interface, a virtual representation of the action or the intent, and the virtual representation includes as annotations on the augmented reality interface at least a portion of the planned trajectory of the robotic device or highlights the object to be handled by the robotic device.

In one aspect, a system is provided that comprises a means for receiving information that indicates an action or an intent of a robotic device to perform a task, and the action or the intent includes one or more of a planned trajectory of the robotic device to perform at least a portion of the task and an object to be handled by the robotic device to perform at least a portion of the task. The system also includes a means for providing, for display by a computing device on an augmented reality interface, a virtual representation of the action or the intent, and the virtual representation includes as annotations on the augmented reality interface at least a portion of the planned trajectory of the robotic device or highlighting the object to be handled by the robotic device.

In still another aspect, another computer-implemented method is provided comprising receiving information that indicates an action or an intent of a robotic device to perform a task in a physical environment, and the action or the intent includes one or more of a planned trajectory of the robotic device to perform at least a portion of the task and an object to be handled by the robotic device to perform at least a portion of the task. The method also includes providing, by a device into the physical environment, a virtual representation of the action or the intent, wherein the virtual representation includes an indication of at least a portion of the planned trajectory of the robotic device or highlighting the object to be handled by the robotic device.

In still another aspect, another system is provided comprising a means for receiving information that indicates an action or an intent of a robotic device to perform a task in a physical environment, and the action or the intent includes one or more of a planned trajectory of the robotic device to perform at least a portion of the task and an object to be handled by the robotic device to perform at least a portion of the task. The system also includes a means for providing, by a device into the physical environment, a virtual representation of the action or the intent, wherein the virtual representation includes an indication of at least a portion of the planned trajectory of the robotic device or highlighting the object to be handled by the robotic device.

These as well as other aspects, advantages, and alternatives will become apparent to those of ordinary skill in the art by reading the following detailed description, with reference where appropriate to the accompanying drawings.

DETAILED DESCRIPTION

Figure 1:
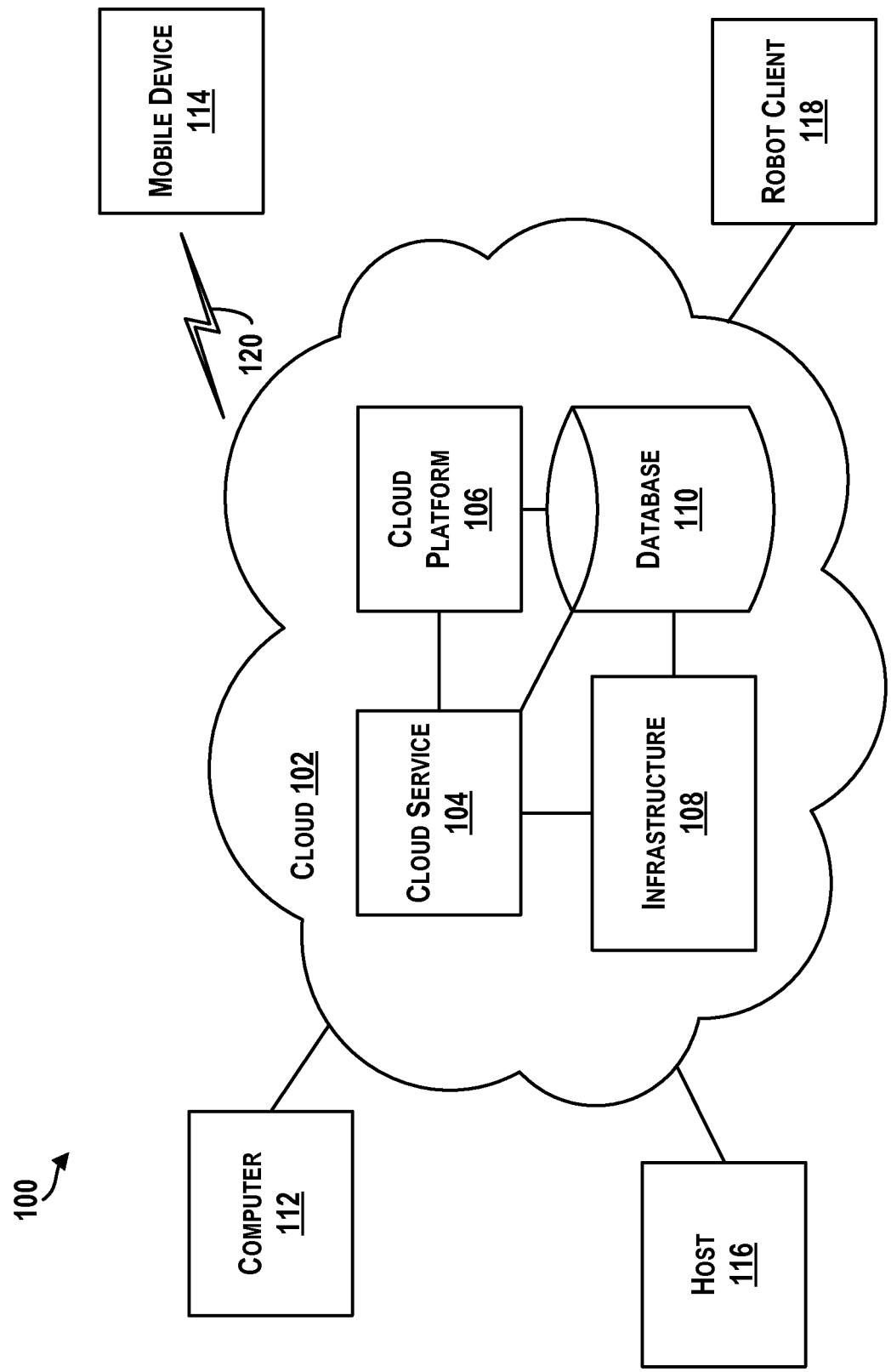
FIG. 1 is an example system for cloud-based computing, according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. OVERVIEW

Within examples, augmented reality interfaces may be used to provide feedback or information that indicates an action or intent of the robotic device. As one example, a head mounted display may be provided that includes a live video feed of the robot or simply a see-through display providing a wearer-view. The robotic device may be programmed to communicate with the head-mounted display so as to provide annotations that can be visually displayed by the head-mounted display and overlaid onto the live video feed. The annotations may indicate, for example, a future navigation path of the robotic device, such as to display a set of virtual footprints to represent future walking steps of the robotic device. While the robotic device is moving, the head-mounted display can overlay representations of future footsteps onto the live video feed or wearer-view to indicate the trajectory of the robotic device.

Augmented reality interfaces may be provided on other devices as well. For example, a mobile phone may be programmed to include an application that is synchronized with a state of the robotic device so that the robotic device can broadcast to any nearby phones its intent and the phone then renders information overlaid onto a live camera feed of the phone to illustrate a representation of the intent. In other examples, the phone may additionally or alternatively receive a camera feed from a field of view of the robotic device and overlay details of the intent onto that camera feed. The details may include semantic information about future intent, or about an understanding of what the robotic device is intending to do.

The robotic device may provide the information before and while moving to communicate future motions and intent of details useful for providing feedback. In addition, a user may then have time to confirm that this is a desired behavior or a task for the robotic device to perform. As an example, the robotic device may be instructed to select a bowl from the kitchen from among a number of bowls. The robotic device may make an assessment of needs of a user, and select a bowl based on estimates of size, type, and material. The robotic device may provide an overlay annotation to a head-mounted display, and the head-mounted display can display the annotation overlaid onto the wearer-view to highlight the bowl that the robotic device is going to retrieve. A user may then be able to see the selected bowl and modify or confirm an instruction to the robotic device.

An augmented reality interface is then used to provide feedback on a state and future movements of the robotic device moving in a physical world. The interface includes overlays to digitally annotate a video feed or wearer-view with information (semantic information). The information may indicate a navigation intent, a set of future footsteps, or a stripe on the floor for a wheeled robot that covers a future trajectory of the robot, for example. In instances in which the robotic device is interacting or going to interact with an object, the object to be manipulated could be highlighted in the overlay. Additionally, the robotic device may also actively highlight the object using a steerable laser pointer providing a dot on the object or using a projector to project light onto the object and to indicate a place where the robot plans to pick up the object (e.g., highlight a handle on a pitcher).

In further examples, the robotic device may receive communications from a device with information for confirming or modifying a future trajectory or intent of the robotic device. For instance, a user may receive the future intent overlaid onto an augmented reality interface, and then use a device, such as a mobile computer or special purpose device (e.g., wand-like device or smart-watch) that includes an inertial measurement unit (IMU) or accelerometer to track gestures and positions. The device may provide information to the robotic device, such as where a user is pointing to command the robotic device to go somewhere. A user may point the device and press a button to signify a start, and then the robotic device may receive the instructions, interpret the movement and motion of the device as a directional command, and compute a path from A to B, and subsequently provide information to be overlaid onto an augmented display to indicate its future footsteps that are planned. Instructions may be provided in other ways as well, such as by projecting light along a path using a laser pointer, for example.

After providing the command, the device may receive the augmented reality visual overlay of where the robotic device is planning to go, and if the robotic device misunderstood a location or the user wants to modify a course or path, the user can do so before the robotic device has traversed too far along the path.

In still further examples, the robotic device or other computing devices in the area, may provide the virtual representation into the physical environment. For example, a projection of a planned trajectory can be provided onto the floor in the environment, or an object to be handled by the robotic device can be highlighted by the robotic device.

II. EXAMPLE ARCHITECTURE FOR ROBOT-CLOUD INTERACTION

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices, thereby taking advantage of the server devices' processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more or fewer components, and each of the cloud service 104, the cloud platform 106, the cloud infrastructure 108, and the database 110 may comprise multiple elements as well. Thus, one or more of the described functions of the system 100 may be divided into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device with a transmitter/receiver including a laptop computer, a mobile telephone, etc., that is configured to transmit/receive data to/from the cloud 102.

The robot client 118 may comprise any computing device that has connection abilities to the cloud 102 and that has an actuation capability (e.g., electromechanical capabilities) so as to interact with its surroundings and environment. A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, sonar, optical sensors, biosensors, Radio Frequency identification (RFID) systems, Near Field Communication (NFC) chip, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

Figure 2A:
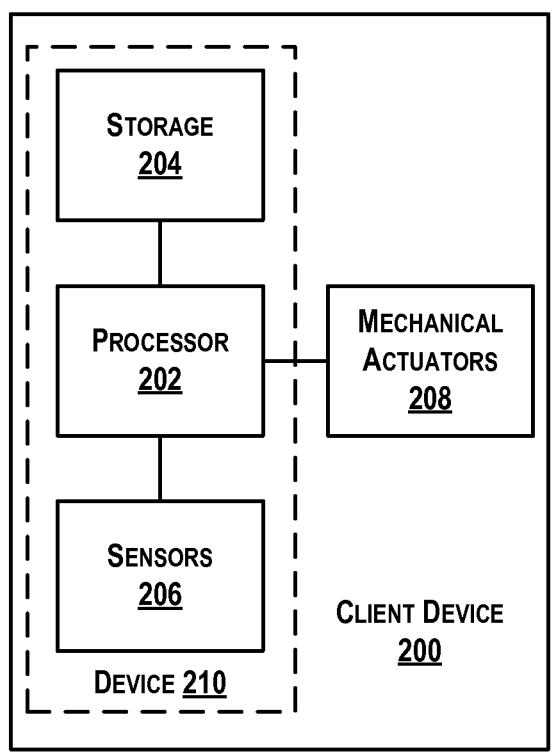
FIG. 2A illustrates an example client device.

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone, smartphone, tablet computer, etc. to function as the "brains" or control components of the robot. The device 210 may be considered a module of the robot. The device 210 may be physically attached to the robot. For example, a smartphone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a smartphone to download the routine from the cloud, and when the smartphone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone, smartphone, tablet computer, etc.), which can provide additional peripheral components to the device 200, such as any of an accelerometer, gyroscope, compass, GPS, camera, WiFi connection, a touch screen, etc., that are included within the device 210.

Figure 2C:
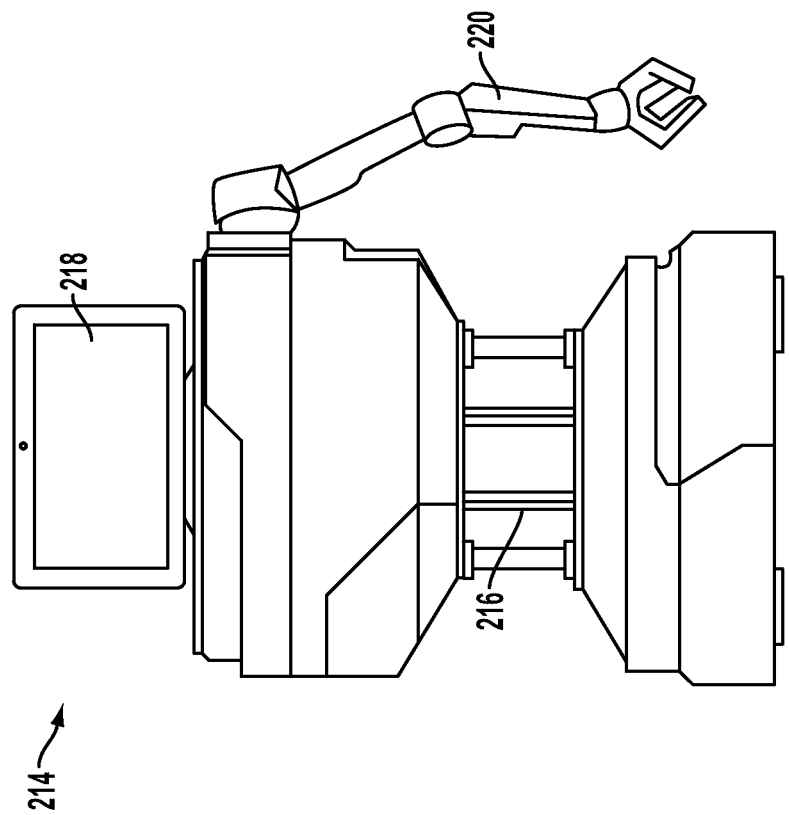
FIG. 2C illustrates another example of a robot.
Figure 2B:
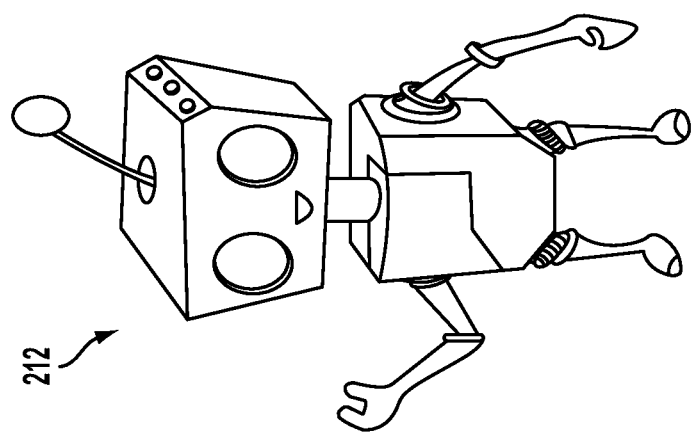
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples may also include ROSJAVA. A robot operating system may include publish and subscribe functionality, and may also include functionality to control components of the robot, such as head tracking, base movement (e.g., velocity control, navigation framework), etc.

Figure 3:
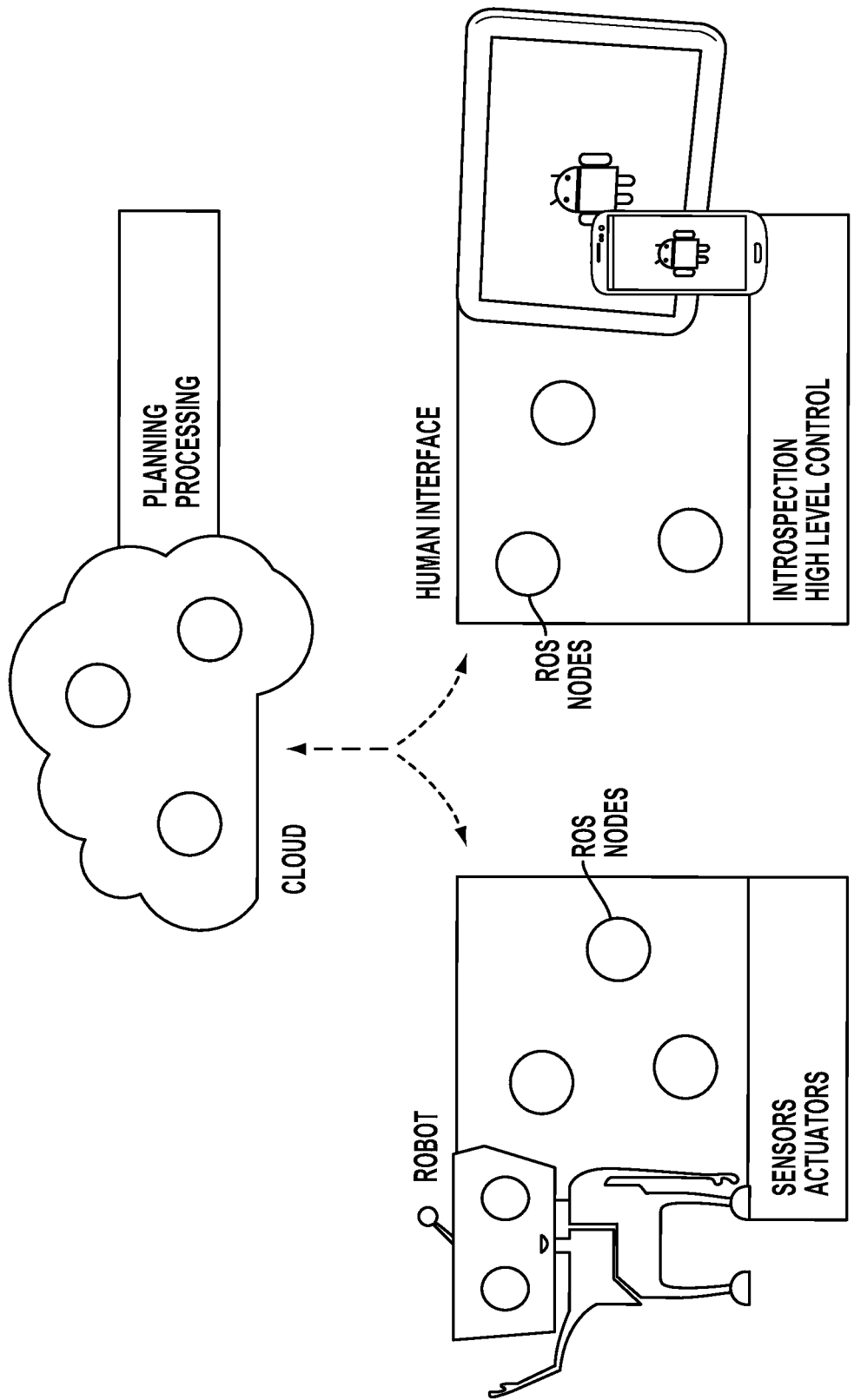
FIG. 3 illustrates an example of a conceptual robot-cloud interaction.

FIG. 3 illustrates an example of a conceptual robot-cloud interaction. A robot, such as the robots described and illustrated in FIGS. 2A-2C, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

In examples described herein, the robot may interact with the cloud to perform any number of actions, such as to share information with other cloud computing devices. Within examples, the robot may interact with the cloud to facilitate object recognition, to perform a mapping function, or to perform navigational functions (i.e., receive a map/navigation pathway previously traversed by another robot). In other examples, the robot may interact with the cloud to perform mapping of objects in an area, to perform inventory of objects, and to perform voice recognition by and/or control of a robot. The robot may perform any actions or queries to the cloud as described herein based on contextual or situational information.

In some examples, rather than require a robot's knowledge base to be stored onboard the robot, some embodiments enable robots to store and access data at an external location, such as on a server and/or other computing device. The external location may receive data and/or or requests from one or more robots. A server may store received data from one or more robots and/or distribute all or part of the stored data to one or more robots so as to create a common knowledge base amongst the robots, where robots can obtain instructions and/or data.

In some embodiments, the robot may have information relating to an object and/or area in which the robot operates. The area may be associated with a map, location, etc. The robot may send the information relating to the area to a server, which may include an object recognition system to identify objects associated with the information from the robot.

The robot and/or server may use contextual analysis to determine and identify objects. For example, if the robot is in an office, the robot may access an "office" database of objects to perform recognitions. As another example, the robot may operate with situational awareness such that a robot may inventory objects in a scene, and if given a command by a user, the robot can determine the content or interpret the meaning of the command based on a situation of the scene or by comparing with objects in the scene. For example, the robot may receive a command to retrieve a soda from the refrigerator. The robot may send the command to the server as an input or may optionally use the robot's database of the area to recognize the refrigerator and the soda, for example. Optionally, the robot may send the command to the server, which may recognize the refrigerator and the soda. In embodiments, the robot and/or server may use contextual as well as situational data to recognize the object. Moreover, once the object is recognized, the server may determine an interaction associated with the command and identify one or more computer executable instructions that the robot may execute to perform the interaction, for example.

Figure 4:
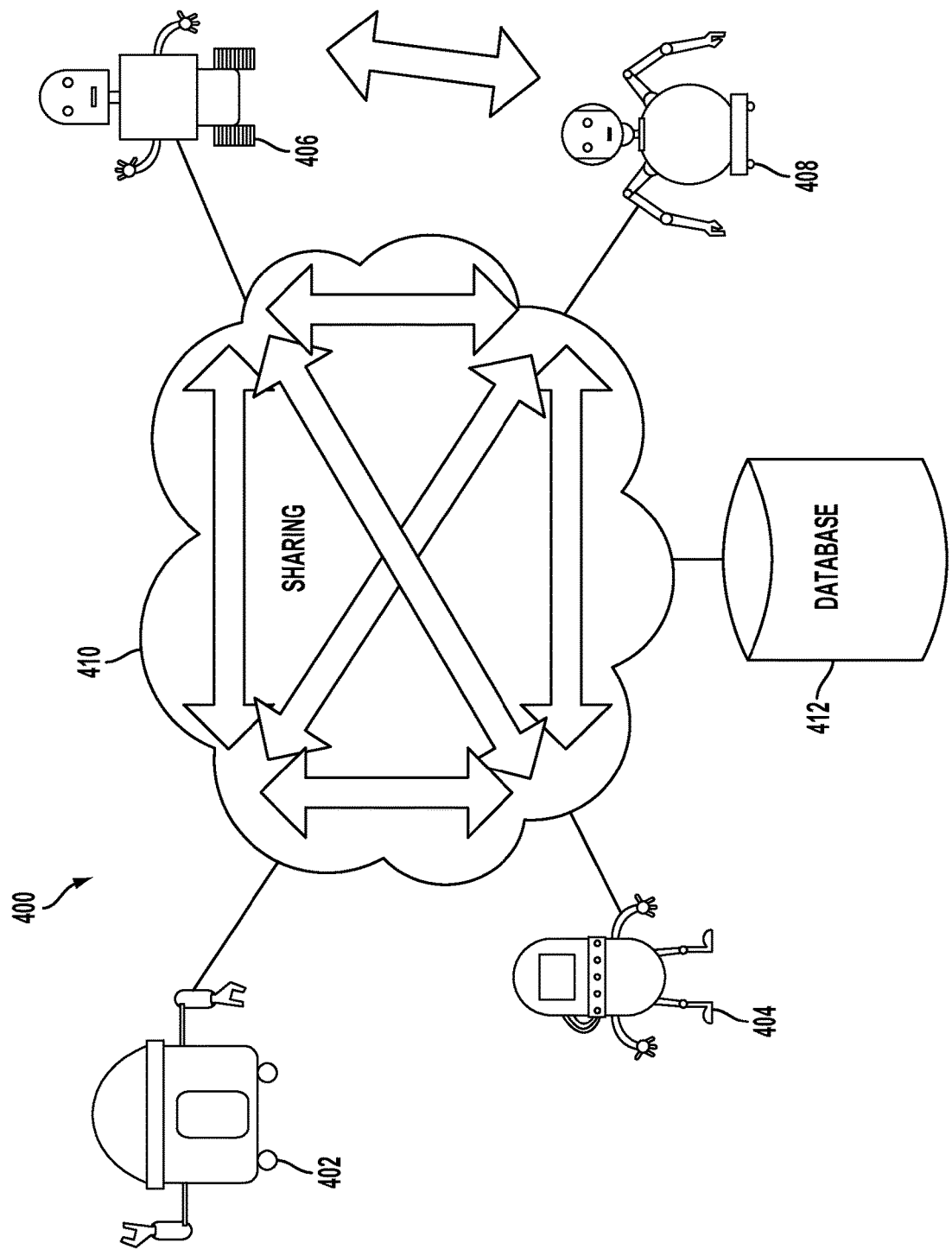
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data about the recognized object to all the robots connected to the cloud 410, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions within an area, with people, with other robots, etc. In one example, each robot 402, 404, 406 and 408 has WiFi or another network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

III. EXAMPLE ROBOT-CLOUD AND ROBOT-DEVICE INTERACTION

A cloud-based service, such as cloud service 104, may be configured to conduct large-scale simulations and send instructions to a robotic system for executing a variety of tasks. A task may be simulated across a wide range of possible inputs (e.g., a brute-force search) using information about the robotic system's capabilities, sensor data, and information in the database related to the particular task. Generally, a robotic system may be preconfigured to carry out specific tasks. However, using a cloud-based service may allow a robotic system to learn how to carry out new tasks and to discover new strategies and approaches for interaction with the environment. Other examples are possible as well.

Figure 5:
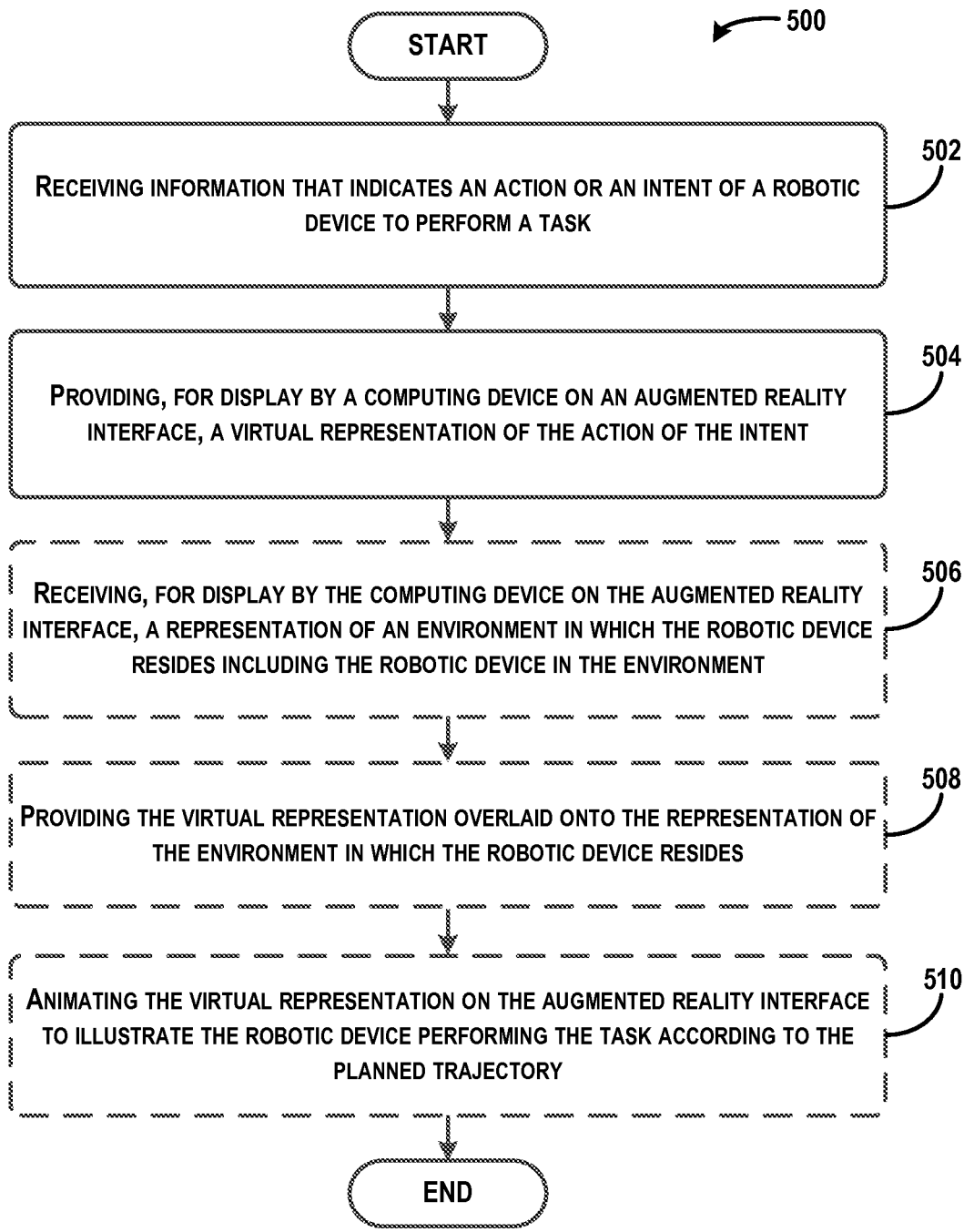
FIG. 5 is a block diagram of an example method for providing augmented reality interfaces to display virtual representations of robotic device actions, in accordance with at least some embodiments described herein.

FIG. 5 is a block diagram of an example method for providing augmented reality interfaces to display virtual representations of robotic device actions, in accordance with at least some embodiments described herein. Method 500 may include one or more operations, functions, or actions as illustrated by one or more of blocks 502-510. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

Illustrative methods, such as method 500, may be carried out in whole or in part by a component or components in the cloud and/or a robotic system, such as by the one or more of the components of the system 100 shown in FIG. 1, by the one or more of the components of the client device 200 shown in FIG. 2A, by the one or more of the components of the robot 212 shown in FIG. 2B, by the one or more of the components of the robot 214 shown in FIG. 2C, by the one or more components of the conceptual robot-cloud interaction shown in FIG. 3, and by the one or more of the components of the system 400 shown in FIG. 4. However, it should be understood that example methods, such as method 500, may be carried out by other entities or combinations of entities (i.e., by other computing devices and/or combinations of computing devices), without departing from the scope of the invention.

For example, functions of the method 500 may be fully performed by a computing device (or components of a computing device such as one or more processors), or may be distributed across multiple components of the computing device, across multiple computing devices, and/or across a server. In some examples, the computing device may receive information from sensors of the computing device, or where the computing device is a server the information can be received from another device that collects the information. As other examples, the method 500 may be performed by a computing device, by a server, or by a robotic device.

As shown by block 502, method 500 includes receiving information that indicates an action or an intent of a robotic device to perform a task. The action or the intent may include one or more of a planned trajectory of the robotic device to perform at least a portion of the task and an object to be handled by the robotic device to perform at least a portion of the task. In other examples, the method 500 may optionally include determining the planned trajectory of the robotic device to perform at least a portion of the task and determining the object to be handled by the robotic device to perform at least a portion of the task based on the action or the intent.

The information may be received by a computing device from a robotic device that has been programmed or requested to perform a task. In other examples, the information may be received by a server in communication with the robotic device or with a computing device that controls the robotic device. Still further, the information may be considered to be received by a processor of the robotic device from a computing device that controls the robotic device.

As shown by block 504, the method 500 also includes providing, for display by a computing device on an augmented reality interface, a virtual representation of the action or the intent. The virtual representation includes as annotations on the augmented reality interface at least a portion of the planned trajectory of the robotic device or highlighting the object to be handled by the robotic device. Within examples, instead of or in addition to providing audio feedback by the robotic device, user friendly feedback can be provided using augmented reality.

The information can be provided by the robotic device to the computing device, by a server in communication with the robotic device (such as to program the robotic device) to the computing device, or by other devices that provide control information to the robotic device. The information may also be considered provided by one or more processors for display by the computing device, and the one or more processors may be components of the computing device, components of the robotic device, or components of yet another computing device (e.g., a server).

The annotations may include graphics provided on the augmented reality interface enabling communication of intent of the robotic device to provide feedback for users. The information may be received before the robotic device initiates performance of the task. For example, the information can be provided before and while the robotic device performs the task to enable display of the planned trajectory that the robotic device plans to traverse in the future to perform the task. The robotic device may communicate to future motions and intent of details useful for providing quick feedback and giving users time to confirm this is a desired behavior to perform, for example.

Figure 6:
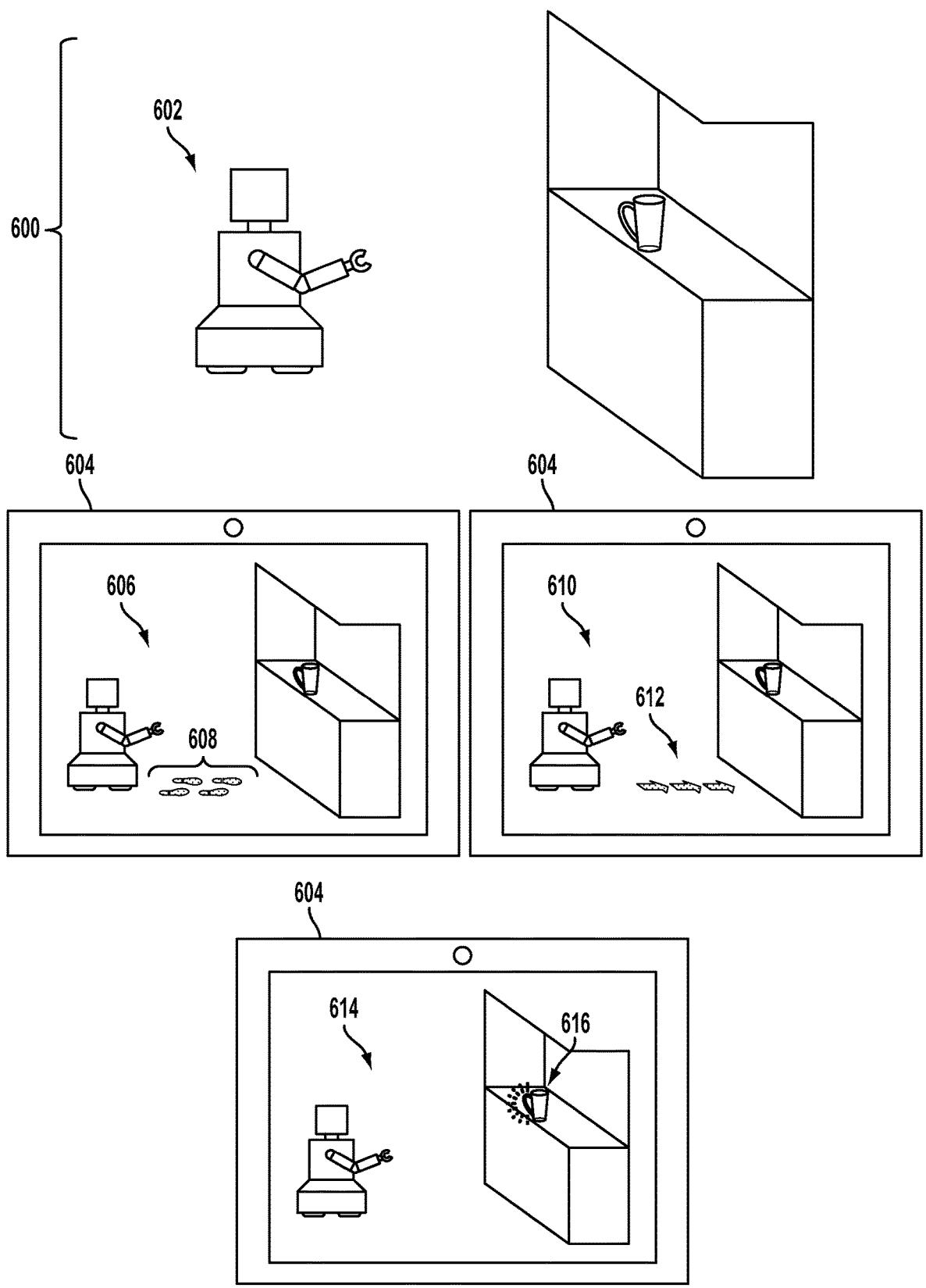
FIG. 6 illustrates an example environment with a robotic device, and example virtual representations of planned actions by the robotic device.

FIG. 6 illustrates an example environment 600 with a robotic device 602, and example virtual representations of planned actions by the robotic device 602. Within the environment 600, the robotic device 602 is moving toward a countertop that includes a pitcher. The robotic device 602 may have been instructed to pick up the pitcher and move it to another location. FIG. 6 also illustrates a computing device 604 shown with three different example virtual representations 606, 610, and 614.

In one example, the computing device 604 may receive information from the robotic device 602 that indicates the planned action of the robotic device 602, and the computing device 604 may be programmed to display a representation of the environment 600 with the virtual representation 606 including a set of virtual footprints 608 to represent future movement of the robotic device along a portion of the planned trajectory toward the countertop.

In another example, the computing device 604 may receive information from the robotic device 602 that indicates the planned action of the robotic device 602, and the computing device 604 may be programmed to display a representation of the environment 600 with the virtual representation 610 including a line or arrows 612 on a floor covering the portion of the planned trajectory of the robotic device.

In still another example, the computing device 604 may receive information from the robotic device 602 that indicates the planned action of the robotic device 602, and the computing device 604 may be programmed to display a representation of the environment 600 with the virtual representation 614 including an indication 616 on the object where the robotic device plans to handle the object. This may include highlighting a handle of the pitcher, for example.

In yet another example, the computing device 604 may receive information from the robotic device 602 that indicates the planned action of the robotic device 602, and the computing device may be programmed to display a representation of the environment 600 with another virtual representation including an indication of a whole volume of space or a swept volume of an area the robotic device 602 intends to occupy or move through. The virtual representation displayed may include virtual objects that are occluded to indicate where the robotic device 602 is going to be soon, so that a user can see where the robotic device 602 has reserved volume in order to stay out of the way.

Thus, as the robotic device moves in the physical world, feedback can be provided overlaid on a display of the computing device 604 to digitally annotate the display with information (e.g., semantic information) that indicates navigation intent, a set of future footsteps, or with a wheeled robot a stripe on floor where planning to roll, etc.

Within examples, the computing device is located remotely from the robotic device, and the virtual representation can be provided for display overlaid onto a field of view of the computing device. The field of view of the computing device may include objects or environment within the field of view, and as the field of view includes an area covering at least a portion of the planned trajectory or some item to be handled by the robotic device, the virtual representation can be overlaid on the field of view. Thus, in an example, the computing device may include a mobile telephone being carried by a user, and as the user moves into an area overlapping some of the planned trajectory of the robotic device, such as the countertop shown in FIG. 6, the mobile phone may display the planned trajectory as a virtual representation on an augmented reality interface overlaying a field of view of the mobile phone. The field of view may be provided by a live video feed of the mobile phone.

Referring back to FIG. 5, in other examples, as shown by block 506, the method 500 may optionally include receiving, for display by the computing device on the augmented reality interface, a representation of an environment in which the robotic device resides including the robotic device in the environment. As shown by block 508, the method 500 may optionally include providing the virtual representation overlaid onto the representation of the environment in which the robotic device resides. As shown by block 510, the method 500 may optionally include animating the virtual representation on the augmented reality interface to illustrate the robotic device performing the task according to the planned trajectory. In this example, a field of view of the computing device is not relevant since a display of the environment in which the robotic device operates is provided, and the virtual representation is overlaid onto that display. Thus, a user with a computing device can visualize intents of a robotic from on a computing device that is located at any location away from the robotic device. This example is illustrated in FIG. 6 in which a representation of the environment 600 is provided to the computing device 604, and the virtual representation (e.g., the virtual representations illustrating footprints 608, arrows 612, and highlighting 616) are provided to overlay the environment 600.

In another example, the method 500 may include receiving a camera feed from a field of view of the robotic device, and providing the virtual representation overlaid onto the camera feed from the field of view of the robotic device. In this example, the computing device may provide a display to illustrate a map of how the robotic device sees the environment to share intents of the robotic device to the user.

Figure 7:
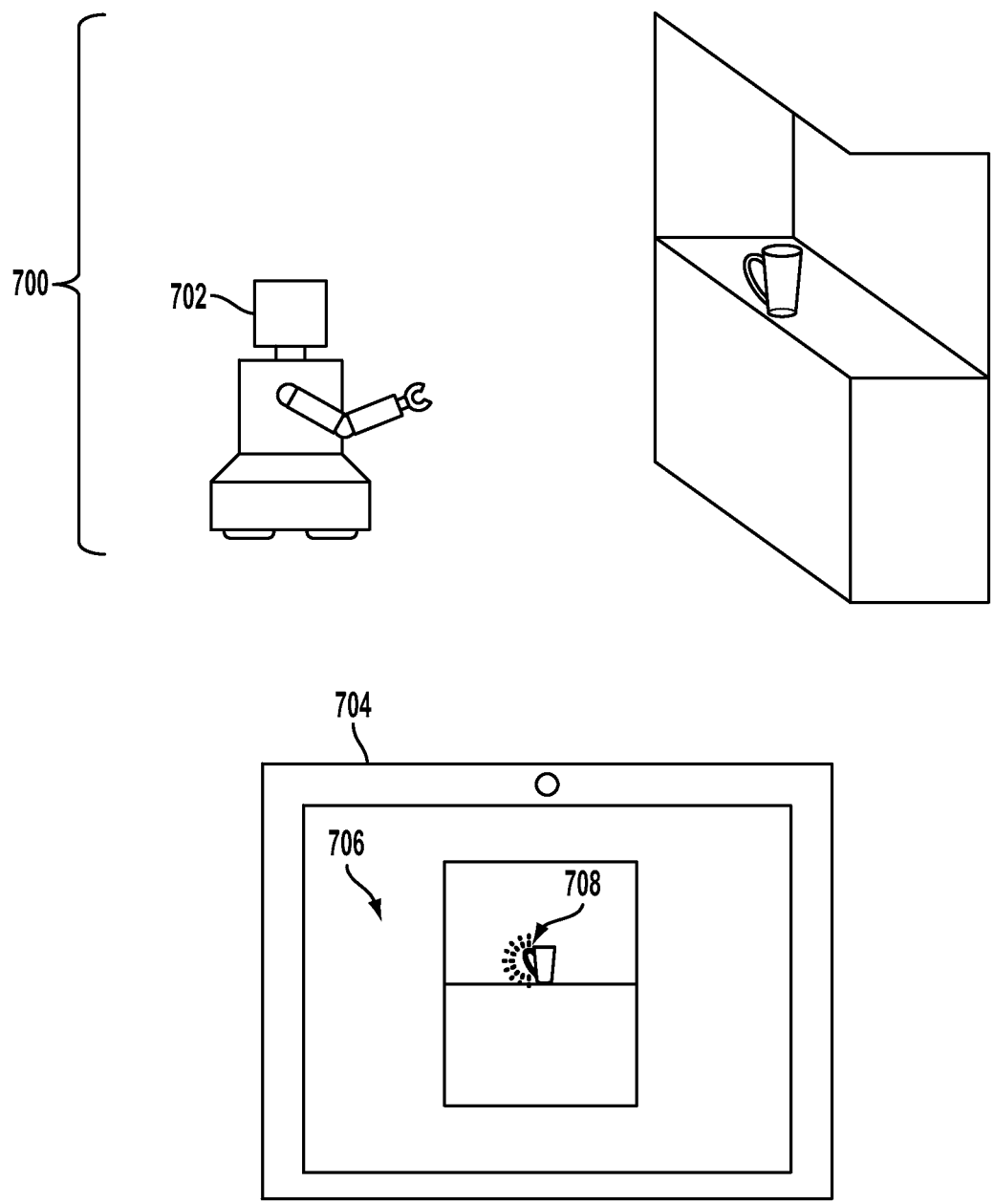
FIG. 7 illustrates another example environment with a robotic device, and an example virtual representation of planned actions by the robotic device.

FIG. 7 illustrates another example environment 700 with a robotic device 702, and an example virtual representation of planned actions by the robotic device 702. Within the environment 700, the robotic device 702 is moving toward a countertop that includes a pitcher. The robotic device 702 may have been instructed to pick up the pitcher and move it to another location. FIG. 7 also illustrates a computing device 704 shown with an example virtual representation 706 seen from a field of view of the robotic device 702. The computing device 704 may receive a camera feed from the robotic device 702, and an annotation of a future action or intent is overlaid onto the camera feed, such as here, a handle of the pitcher is highlighted 708 to indicate that the robotic device 702 intends to pick up the pitcher by the handle. In this manner, a scene from a field of view of the robotic device 702 can be provided to the computing device 704 for display with annotations overlaid thereon.

In another example, the computing device may include a head mountable device (HMD), and the virtual representation may be overlaid onto a wearer-view of the HMD. Within an example, the HMD can overlay the virtual representation onto the wearer-view and as the wearer-view includes a portion of a future navigation path of the robotic device, virtual footprints can be provided to represent future walking steps of the robot.

Figure 8A:
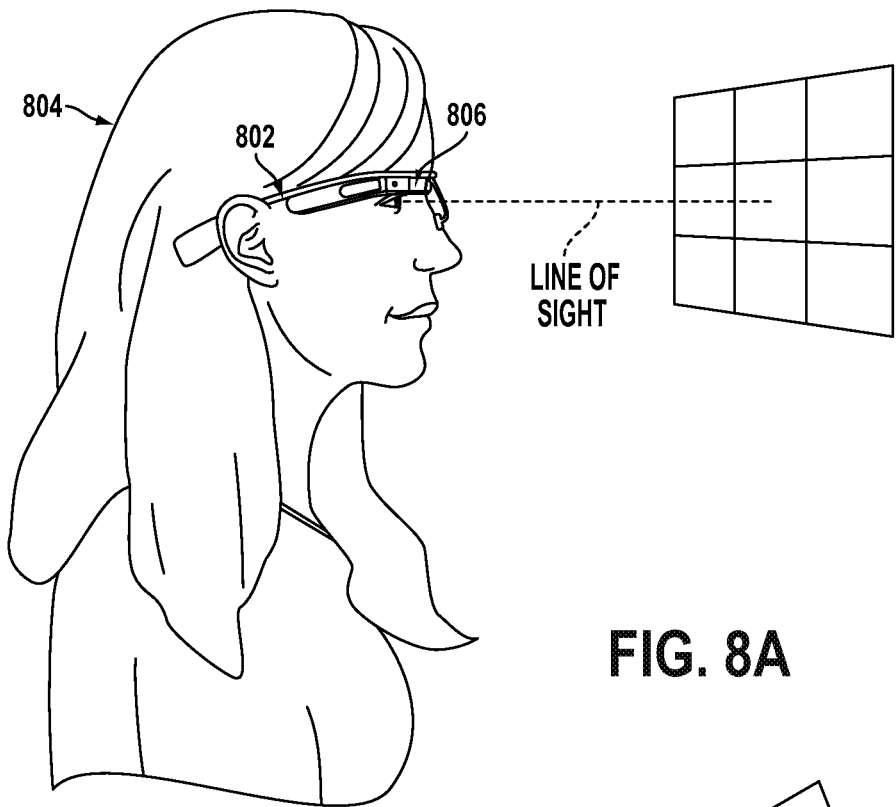
FIG. 8A illustrates an example head mountable device (HMD) worn by a wearer.
Figure 8B:
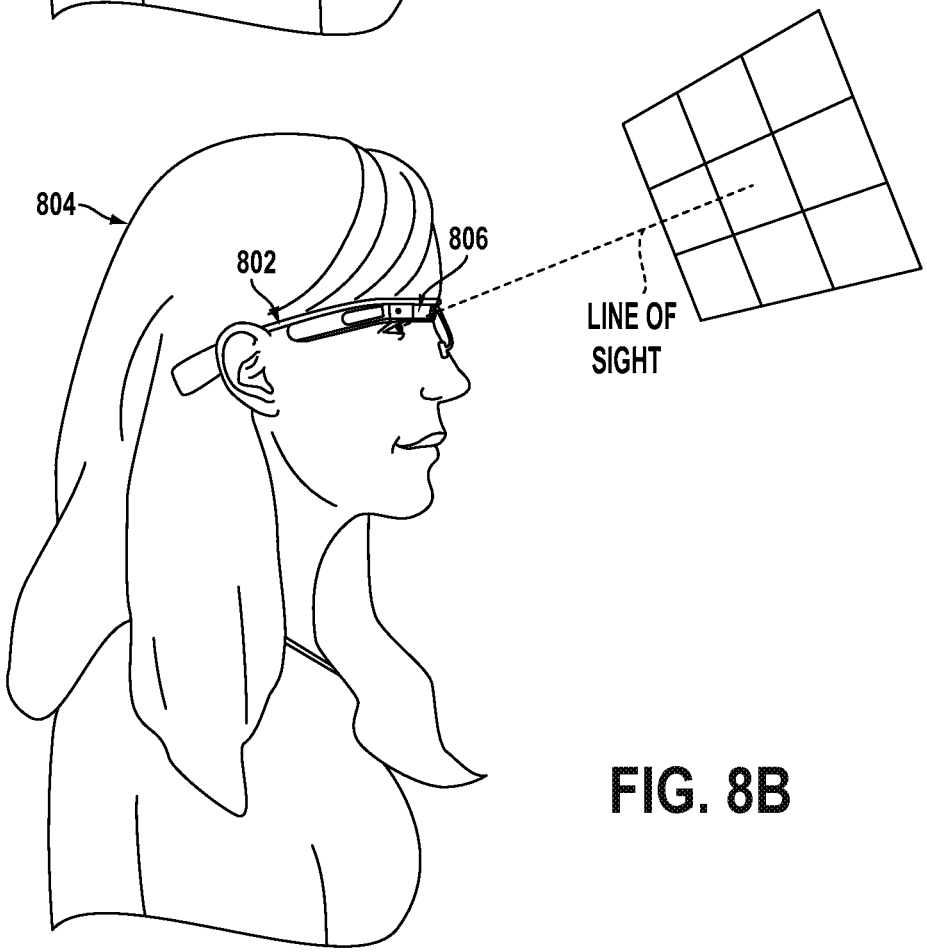
FIG. 8B illustrates another example head mountable device (HMD) worn by a wearer.

FIGS. 8A-8B illustrate an example head mountable device (HMD) worn by a wearer. FIG. 8A illustrates an HMD 802 being worn by a wearer 804. In the illustrated example, a display 806 of the HMD 802 may be arranged such that when the HMD 802 is worn, the display 806 is positioned in front of or proximate to a user's eye. For example, the display 806 may be positioned below a center frame support and above a center of the wearer's eye, as shown in FIG. 8A. Further, in the illustrated configuration, the display 806 may be offset from the center of the wearer's eye (e.g., so that the center of the display 806 is positioned to the right and above of the center of the wearer's eye, from the wearer's perspective).

Configured as shown in FIGS. 8A-8B, the display 806 may be located in a periphery of a field of view of the wearer 804 when the HMD 802 is worn. Thus, as shown by FIG. 8A, when the wearer 804 looks forward, the wearer 804 may see the display 806 with their peripheral vision. As a result, display 806 may be outside the central portion of the wearer's field of view when their eye is facing forward, as it commonly is for many day-to-day activities, as shown in FIG. 8A and the wearer's line of sight. Such positioning can facilitate unobstructed eye-to-eye conversations with others, as well as generally providing unobstructed viewing and perception of the world within the central portion of the wearer's field of view.

Further, when the display 806 is located as shown, the wearer 804 may view the display 806 by, e.g., looking up with their eyes only (possibly without moving their head). This is illustrated as shown in FIG. 8B, where the wearer 804 has moved their eyes to look up and align their line of sight with the display 806. A wearer might also use the display 806 by tilting their head down and aligning their eye with the display 806. When a line of sight aligns with the display 806, the wearer 804 may view the virtual representation overlaid onto the wearer-view of the HMD 802, for example. The virtual representation that is overlaid may include any of the virtual representations shown in FIG. 6 or FIG. 7.

Referring back to FIG. 5, in still further examples, the method 500 may include determining one or more robotic devices in proximity to the computing device, and requesting, from the one or more robotic devices in proximity to the computing device, information that indicates actions or intents of the one or more robotic devices. Subsequently, the method 500 includes providing, for display by the computing device on the augmented reality interface, the virtual representation comprises providing for display one or more virtual representations per the one or more robotic devices that respectively indicate the actions or the intents. In this example, a user may select which robotic devices to monitor, or may request to monitor any and all robotic devices nearby, in close proximity, or within some threshold distance, so as to understand future actions of all robotic devices.

As a specific example for monitoring may robotic devices, a user may be within a manufacturing facility in which many robotic devices are operating. A user may desire information indicating planned movements and actions of any and all nearby robotic devices, and can request such information from the nearby devices. A user's computing device may receive the information and display a virtual representation of the future actions of all robotic devices nearby overlaid onto a scene of the manufacturing facility for viewing by the user.

Figure 9:
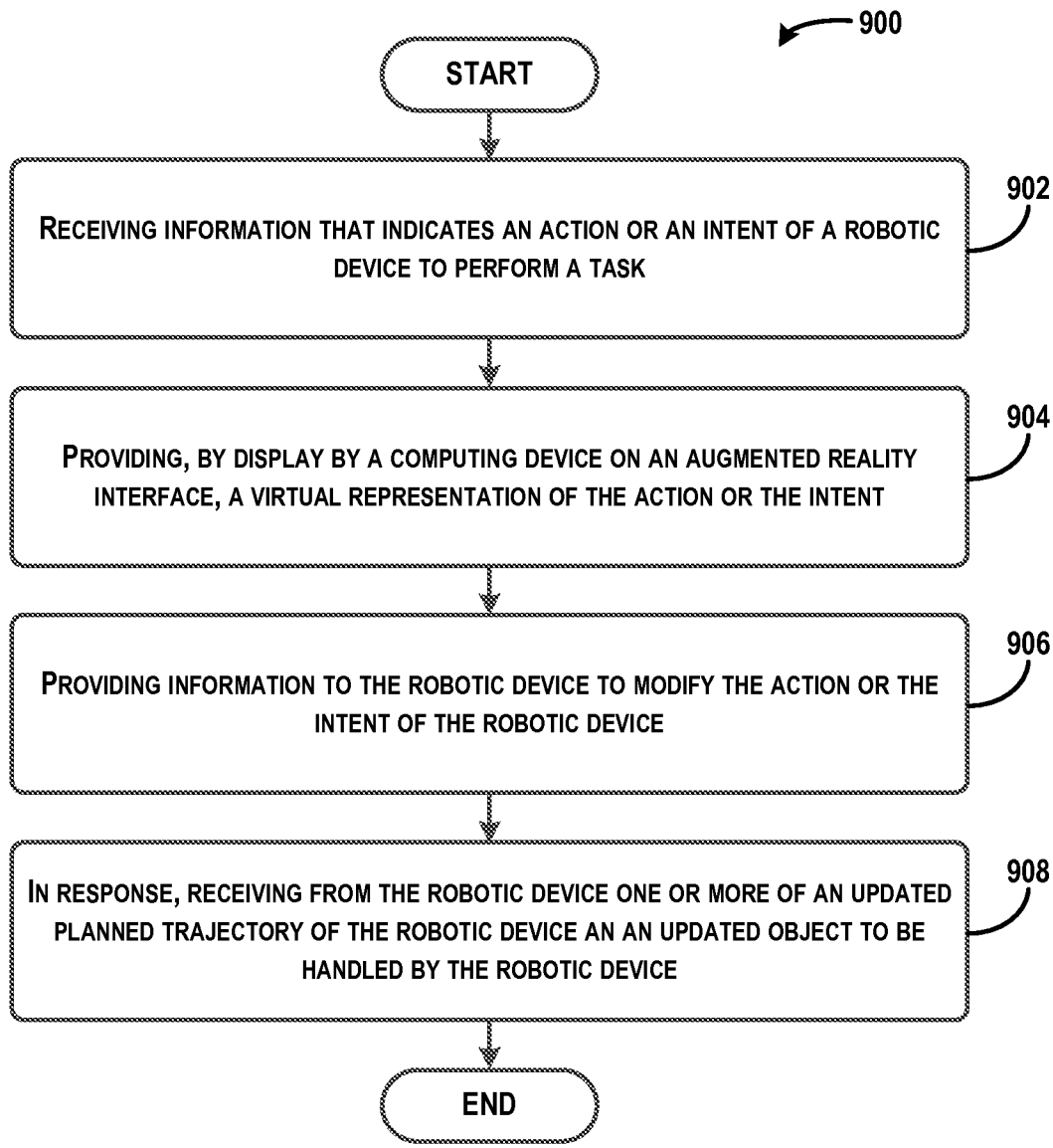
FIG. 9 is a block diagram of another example method for providing augmented reality interfaces to display virtual representations of robotic device actions, in accordance with at least some embodiments described herein.

FIG. 9 is a block diagram of another example method for providing augmented reality interfaces to display virtual representations of robotic device actions, in accordance with at least some embodiments described herein.

As shown by block 902, method 900 includes receiving information that indicates an action or an intent of a robotic device to perform a task. As shown by block 904, the method 900 also includes providing, for display by a computing device on an augmented reality interface, a virtual representation of the action or the intent.

As shown by block 906, the method 900 also includes providing information to the robotic device to modify the action or the intent of the robotic device. The information can include outputs of an accelerometer of the computing device based on motion of the computing device. As an example, after seeing the planned intents of the robotic device, a user may wish to modify such intents. The computing device may include an inertial measurement unit (IMU), an accelerometer, or other sensors to provide outputs of motion of the computing device. The computing device may then be utilized to receive a motion command and provide an output of the motion, such as an output indicating a motion of the computing device moving from a first point to a second point (or from left to right) over an area. The output can be provided to the robotic device to cause the robotic device to move in accordance with the motion, i.e., from the first point to the second point.

In other examples, the information can be provided as a message from the computing device to the robotic device as a new command, for example.

As shown by block 908, the method 900 also includes in response, receiving from the robotic device one or more of an updated planned trajectory of the robotic device and an updated object to be handled by the robotic device. In this example, the robotic device may receive the information and modify the planned trajectory to move between the two points indicated by motion of the computing device.

In other examples, the information can be provided by a second computing device to modify the action or the intent of the robotic device, and in response, the robotic device can provide to the computing device one or more of an updated planned trajectory of the robotic device and an updated object to be handled by the robotic device. As an example, the method 900 may include providing, by a device registered with the robotic device, a projection of light along a pathway to modify the action or the intent of the robotic device, in response, receiving from the robotic device one or more of an updated planned trajectory of the robotic device and an updated object to be handled by the robotic device.

Figure 10:
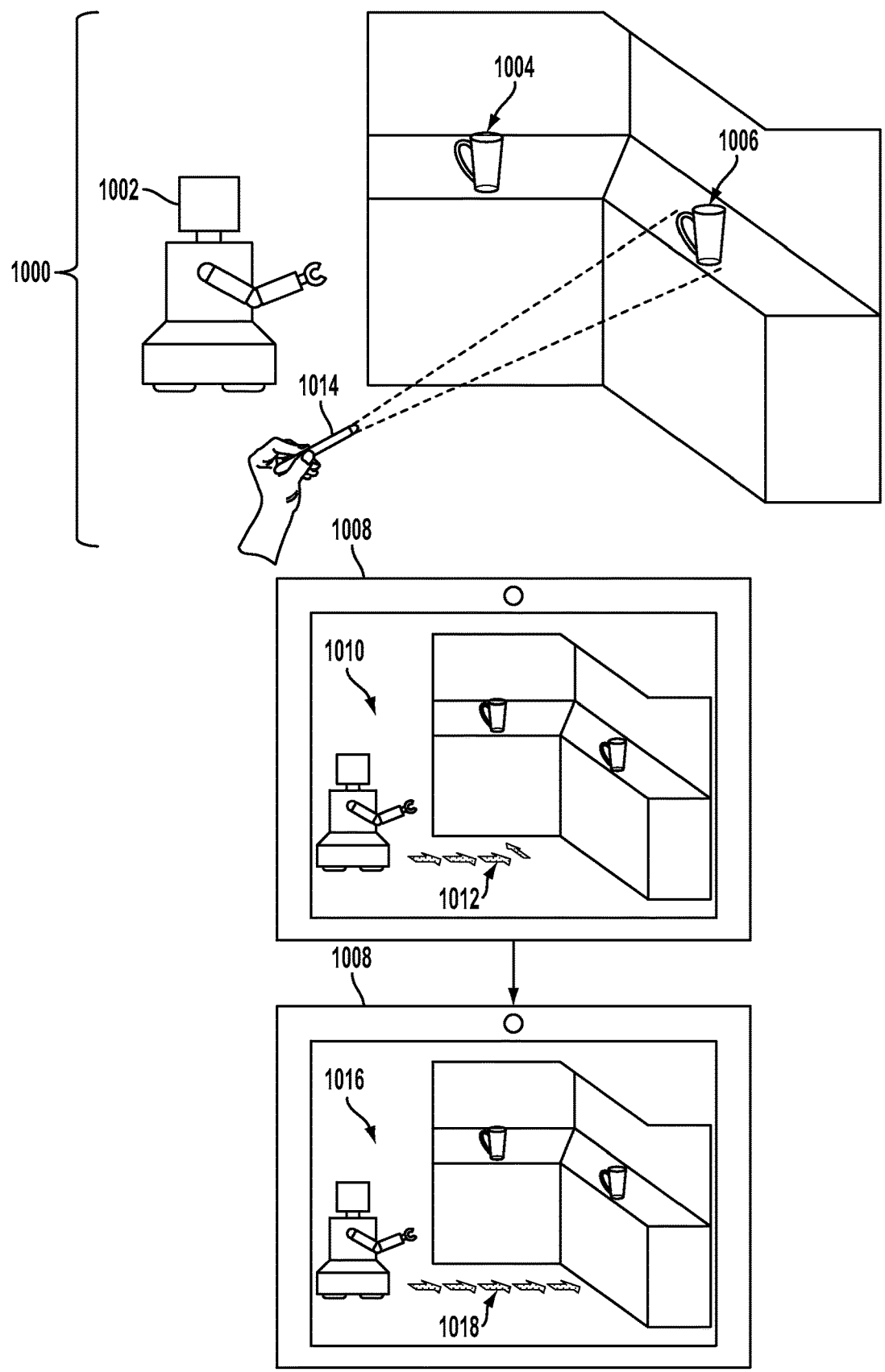
FIG. 10 illustrates another example environment with a robotic device, and an example virtual representation of planned actions by the robotic device.

FIG. 10 illustrates another example environment 1000 with a robotic device 1002, and an example virtual representation of planned actions by the robotic device 1002. In FIG. 10, the robotic device 1002 may be instructed to go to a countertop and pick up a pitcher, and the robotic device 1002 may determine to pick up pitcher 1004 instead of pitcher 1006. The robotic device 1002 may provide information of a planned trajectory to a computing device 1008, which provides a virtual representation 1010 with annotations overlaid thereon including arrows 1012 indicating that the robotic device 1002 intends to move toward the pitcher 1004.

In an example in which a user wishes the robotic device 1002 to pick up the pitcher 1006, a user or the computing device 1008 may provide information to the robotic device 1002 to modify the action or the intent of the robotic device 1002. Within a particular example, as shown in FIG. 10, a wand-like device 1014 may be used that includes an IMU to track gestures/positions of where a user is pointing or where the device is pointing, and because the computing device provides an illustration of future movement of the robotic device, a user may be able to take action to modify the movement before it has begun. In this instance, when a user wishes to command the robotic device 1002 to go to the pitcher 1006, the wand-like device 1014 can be pointed to a location and a button can be pressed to provide a command for the robotic device 1014 to travel to the designated area. Additionally or alternatively, the wand-like device 1014 may project a light onto the pitcher 1006, which can be seen by the robotic device 1002 and interpreted as a request to travel to the pitcher 1006. The robotic device 1002 may then compute a path from its current location to the designated area and provide an updated planned trajectory of new future footsteps to the device 1008. An updated virtual representation 1016 may then be displayed with modified annotations overlaid thereon including arrows 1018 indicating the updated planned actions of the robotic device 1002.

As another example, in an instance in which the robotic device was instructed to retrieve the pitcher from a kitchen, the robotic device may identify one of many pitchers based on assessment of needs (e.g., sizes, types, materials) and highlight the pitcher believed most appropriate for the needs within a virtual representation provided to a computing device. A user may then see the selected pitcher and modify/confirm the command using the computing device 1008, or the wand-like device 1014, for example. In some examples, the computing device 1008 may be operated as the wand-like device 1014.

Figure 11:
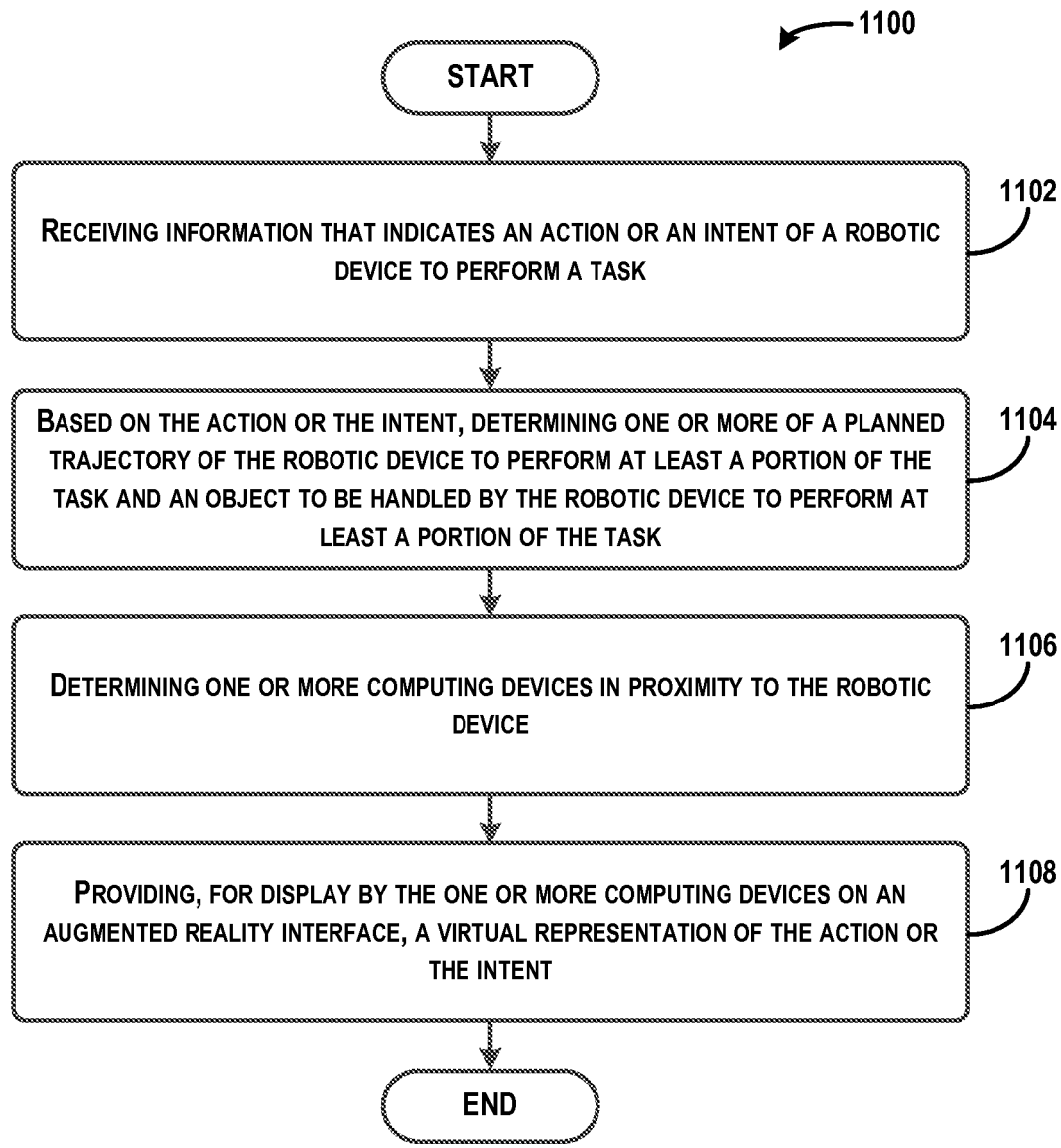
FIG. 11 is a block diagram of another example method for providing augmented reality interfaces to display virtual representations of robotic device actions, in accordance with at least some embodiments described herein.

FIG. 11 is a block diagram of another example method for providing augmented reality interfaces to display virtual representations of robotic device actions, in accordance with at least some embodiments described herein.

As shown by block 1102, the method 1100 includes receiving information that indicates an action or an intent of a robotic device to perform a task. As shown by block 1104, the method 1100 also includes based on the action or the intent, determining one or more of a planned trajectory of the robotic device to perform at least a portion of the task and an object to be handled by the robotic device to perform at least a portion of the task. For example, in an instance in which the method 1100 is performed by the robotic device, a command may be received to perform the task and the robotic device may then determine actions to undertake to perform the task. In an instance in which the robotic device provides the information of the intent to a computing device, the computing device may determine an estimated planned trajectory of the robotic device. Other combinations are possible as well for actions performed by the computing device, by the robotic device, or distributed among both for determining the planned trajectory or planned actions of the robotic device.

As shown by block 1106, the method 1100 also includes determining one or more computing devices in proximity to the robotic device. As an example, the robotic device may determine computing devices in proximity to itself in a number of ways, such as through use of broadcasting messages and receiving acknowledgements from nearby devices, through use of Bluetooth advertising packets to communicate to nearby devices, or through use of beaconing or Bluetooth low energy communications to nearby devices. Other methods are possible as well to determine presence of devices within a threshold distance to the robotic device. In some examples, a server may communicate to the robotic device to provide information as to locations of computing devices near the robotic device.

In other examples, the method 1100 may be performed by a server or other computing device, and may determine a location of the robotic device and of computing devices that may be in proximity (e.g., within a threshold distance to the robotic device).

As shown by block 1108, the method 1100 also includes providing, for display by the one or more computing devices on an augmented reality interface, a virtual representation of the action or the intent, and the virtual representation includes as annotations on the augmented reality interface at least a portion of the planned trajectory of the robotic device or highlights the object to be handled by the robotic device.

In this example, as the robotic device moves, nearby computing devices may have augmented reality interfaces that synchronize with a state of the robotic device so as to display future/planned trajectories or actions of the robotic device. In some instances, the robotic device may broadcast the information that indicates the action or the intent of the robotic device to the computing devices in proximity to the robotic device, so as to provide the information at all times.

In other instances, the robotic device may additionally project at least a portion of the virtual representation onto an environment of the robotic device. A projection device can augment the real physical world (e.g., robot has projector to highlight what it will pick up) to provide additional information as well.

Figure 12:
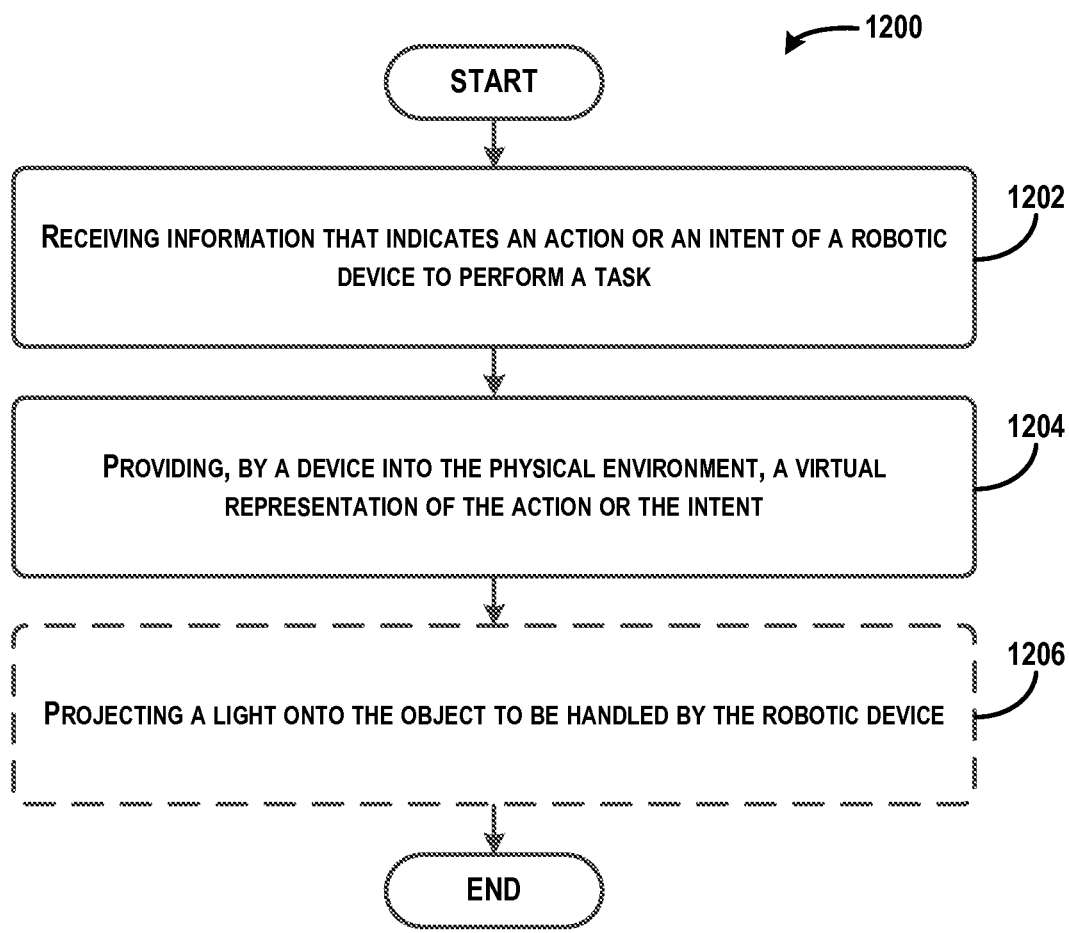
FIG. 12 is a block diagram of another example method for providing augmented reality displays of virtual representations of robotic device actions, in accordance with at least some embodiments described herein.

FIG. 12 is a block diagram of another example method for providing augmented reality displays of virtual representations of robotic device actions, in accordance with at least some embodiments described herein. As shown by block 1202, the method 1200 includes receiving information that indicates an action or an intent of a robotic device to perform a task in a physical environment, and the action or the intent includes one or more of a planned trajectory of the robotic device to perform at least a portion of the task and an object to be handled by the robotic device to perform at least a portion of the task.

As shown by block 1204, the method 1200 includes providing, by a device into the physical environment, a virtual representation of the action or the intent, and the virtual representation includes an indication of at least a portion of the planned trajectory of the robotic device or highlighting the object to be handled by the robotic device. In this example, the physical environment is augmented to indicate the action or intent of the robotic device.

In one example, the device includes a projector, and the method includes the projector projecting the virtual representation of the action or the intent overlaid onto the physical environment. Within yet still further examples, the device may include a camera, or other optical device or light source projecting a light onto a surface or a physical object in the environment. For instance, the robotic device may project a single beam of light on a box that the robotic device has been instructed to pick up, thus indicating to humans or other robotic devices that the robotic device plans to move towards the box and pick it up. The light may be projected at some point after receiving the instruction and may be projected for a predetermined period of time.

In some examples, the projector is included on the robotic device, and thus, the robotic device projects the virtual representation of the action or the intent overlaid onto the physical environment before or during performance of the task. In other examples, the projector or device is located remotely from the robotic device, and the device provides the virtual representation of the action or the intent overlaid onto a surface of the physical environment. The device may receive instructions from a server or from the robotic device indicating the action or intents and indicating to project the virtual representation.

As described within other examples, the virtual representation may include a set of virtual footprints to represent future movement of the robotic device along the portion of the planned trajectory, a line on a floor covering the portion of the planned trajectory of the robotic device, or an indication on the object where the robotic device plans to handle the object.

In other examples, in addition to the virtual representation, an audio announcement may be provided and output by speakers on the robotic device (or in proximity to the robotic device) to announce actions or intents planned by the robotic device.

As shown by block 1206, the method 1200 may optionally include the projector projecting a light onto the object to be handled by the robotic device.

Figure 13:
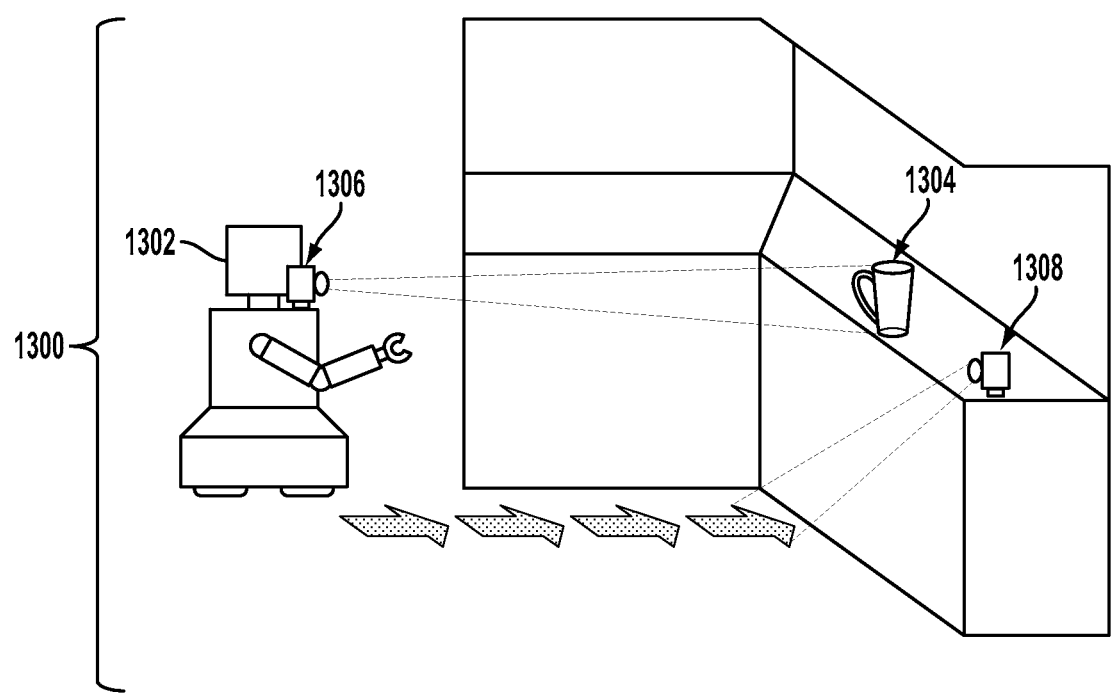
FIG. 13 illustrates another example environment with a robotic device, and an example virtual representation of planned actions by the robotic device.

FIG. 13 illustrates another example environment 1300 with a robotic device 1302, and an example virtual representation of planned actions by the robotic device. In FIG. 13, the robotic device 1302 may be instructed to go to a countertop and pick up a pitcher, and the robotic device 1302 may determine to pick up pitcher 1304. The robotic device 1302 may include a projector 1306 to project a light onto the pitcher 1304. The projector 1306 may also project a planned trajectory or pathway onto the floor. Or, as shown in FIG. 13, another projector 1308 may be provided in the environment, and may receive information regarding the action or intent of the robotic device 1302 and then project a virtual representation of the trajectory overlaid onto the floor (e.g., including arrows indicating that the robotic device 1302 intends to move toward the pitcher 1304).

Or still in yet another example, the projector 1306 may project light into the environment covering a whole volume of space or a swept volume of an area the robotic device 1302 intends to occupy or move through.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the scope being indicated by the following claims.

What is claimed is:

1. A computer-implemented method comprising:
receiving information that indicates an action or an intent of a robotic device to perform a task, wherein the action or the intent includes one or more of a planned trajectory of the robotic device to perform at least a portion of the task and an object to be handled by the robotic device to perform at least a portion of the task;
receiving a camera feed from a field of view of the robotic device;
displaying by a computing device on an augmented reality interface, a virtual representation of the action or the intent, wherein the virtual representation includes as annotations on the augmented reality interface at least a portion of the planned trajectory of the robotic device or highlighting the object to be handled by the robotic device overlaid onto the camera feed from the field of view of the robotic device;
providing, by a device remote from the robotic device, a projection of light along a pathway to modify the action or the intent of the robotic device; and
in response to providing the projection of light, receiving from the robotic device one or more of an updated planned trajectory of the robotic device and an updated object to be handled by the robotic device.

2. The method of claim 1, further comprising:
animating the virtual representation on the augmented reality interface to illustrate the robotic device performing the task according to the planned trajectory.

3. The method of claim 1, wherein the virtual representation includes a set of virtual footprints to represent future movement of the robotic device along the portion of the planned trajectory.

4. The method of claim 1, wherein the virtual representation includes a line on a floor covering the portion of the planned trajectory of the robotic device.

5. The method of claim 1, wherein the virtual representation includes an indication on the object where the robotic device plans to handle the object.

6. The method of claim 1, wherein receiving the information that indicates the action or the intent of the robotic device to perform the task comprises receiving the information before the robotic device initiates performance of the task.

7. The method of claim 1, further comprising:
determining one or more robotic devices in proximity to the computing device;
requesting, from the one or more robotic devices in proximity to the computing device, information that indicates actions or intents of the one or more robotic devices; and
displaying one or more virtual representations per the one or more robotic devices that respectively indicate the actions or the intents.

8. The method of claim 1, further comprising:
providing by the computing device information to modify the action or the intent of the robotic device, wherein the information includes outputs of an accelerometer of the computing device based on motion of the computing device; and
in response, receiving from the robotic device one or more of an updated planned trajectory of the robotic device and an updated object to be handled by the robotic device.

9. The method of claim 1, wherein the computing device is a first computing device, and the method further comprises:
receiving from a second computing device information to modify the action or the intent of the robotic device, wherein the information includes outputs of an accelerometer of the second computing device based on motion of the second computing device; and
in response, receiving from the robotic device one or more of an updated planned trajectory of the robotic device and an updated object to be handled by the robotic device.

10. A non-transitory computer readable medium having stored thereon instructions that, upon execution by a computing device, cause the computing device to perform functions comprising:
receiving information that indicates an action or an intent of a robotic device to perform a task, wherein the action or the intent includes one or more of a planned trajectory of the robotic device to perform at least a portion of the task and an object to be handled by the robotic device to perform at least a portion of the task;
receiving a camera feed from a field of view of the robotic device;
displaying on an augmented reality interface, a virtual representation of the action or the intent, wherein the virtual representation includes as annotations on the augmented reality interface at least a portion of the planned trajectory of the robotic device or highlighting the object to be handled by the robotic device overlaid onto the camera feed from the field of view of the robotic device;
providing, by the computing device which is remote from the robotic device, a projection of light along a pathway to modify the action or the intent of the robotic device; and
in response to providing the projection of light, receiving from the robotic device one or more of an updated planned trajectory of the robotic device and an updated object to be handled by the robotic device.

11. The non-transitory computer readable medium of claim 10, wherein:
receiving the information that indicates the action or the intent of the robotic device to perform the task comprises receiving the information before the robotic device initiates performance of the task; and
displaying the virtual representation of the action or the intent overlaid onto a representation of an environment in which the robotic device resides including the robotic device in the environment.

* * * * *